US009277753B2

(12) United States Patent
Bortone (10) Patent No.: US 9,277,753 B2
(45) Date of Patent: Mar. 8, 2016

(54) SYNCHRONIZED CUTTING AND INJECTION SYSTEM AND METHOD (75) Inventor: Eugenio Bortone, McKinney, TX (US)

(73) Assignee: FRITO-LAY NORTH AMERICA, INC., Plano, TX (US)

( * ) Notice: Subject to any disclaimer, the term of this patent is extended or adjusted under 35 U.S.C. 154(b) by 421 days.

(21) Appl. No.: 12/860,292

(22) Filed: Aug. 20, 2010

(65) Prior Publication Data

US 2012/0042788 A1 Feb. 23, 2012

(51) Int. Cl.
*A21C 9/06* (2006.01)
*A21C 9/04* (2006.01)
*A23P 1/00* (2006.01)
*A21C 11/16* (2006.01)
*B29C 47/92* (2006.01)
*B29C 47/00* (2006.01)
*A21C 3/06* (2006.01)

(52) U.S. Cl.
CPC ........... *A21C 11/163* (2013.01); *B29C 47/0066* (2013.01); *B29C 47/92* (2013.01); *A21C 3/06* (2013.01); *A21C 9/04* (2013.01); *B29C 2947/926* (2013.01); *B29C 2947/92104* (2013.01)

(58) Field of Classification Search
CPC ......... A21C 9/04; A21C 3/06; A47J 37/1214; B65B 3/26; B01L 3/0268; F16N 21/04; B29C 51/32; B29C 45/006; B29C 47/0066; B29C 47/92; B29C 2947/92076; B29C 2947/92104; B29C 2947/926; B29C 2793/0027; B29C 2793/009; G01N 33/10; A22C 7/00; A23P 1/12; A23B 4/285; A23B 7/148; A23L 1/3182
USPC .......... 99/450.7, 487, 450.2, 353; 141/1, 234, 141/311 R; 425/289, 317; 426/106, 281, 426/231, 518, 516
See application file for complete search history.

(56) References Cited

U.S. PATENT DOCUMENTS 2,858,219 A 10/1958 Benson
3,196,810 A * 7/1965 Roth ............................ 425/132
3,464,087 A 9/1969 Koch
(Continued)

FOREIGN PATENT DOCUMENTS

EP 0280484 A2 * 8/1988 ........... A21C 11/163
GB 1077334 7/1967
WO 98/36643 A1 8/1998

OTHER PUBLICATIONS

PCT Search Report and Written Opinion issued under PCT/US2011/048123 mailed on Jan. 23, 2012.

(Continued)

*Primary Examiner* — Dana Ross
*Assistant Examiner* — Hemant Mathew
(74) *Attorney, Agent, or Firm* — Colin P. Cahoon; Stephen Y. Liu; Carstens & Cahoon, LLP (57) ABSTRACT

A system and method for producing a co-filled product. A center layer is fed through a center channel of a die face and an outer layer is fed through an outer layer of a die face. The center channel is coupled to a fluid control device which controls the flow of the center layer. The position of the fluid control device is determined by the location of a cutting blade located downstream from the die face. In one embodiment the fluid control device is synchronized to ensure that when the product is cut by the cutting blade the cutting blade does not cut through the center layer.

27 Claims, 5 Drawing Sheets

(56) References Cited

U.S. PATENT DOCUMENTS

| | | | |
|---|---|---|---|
| 3,535,736 A | 10/1970 | Shanok | |
| 4,120,627 A | 10/1978 | Abe | |
| 4,251,201 A * | 2/1981 | Krysiak | A21C 11/163 264/142 |
| 4,368,017 A | 1/1983 | Rasmussen | |
| 4,533,308 A | 8/1985 | Cloeren | |
| 4,647,468 A * | 3/1987 | Pinto | 426/503 |
| 4,657,718 A | 4/1987 | Sicka | |
| 4,659,580 A * | 4/1987 | Svengren | 426/516 |
| 4,767,305 A * | 8/1988 | Tashiro | 425/308 |
| 4,854,842 A * | 8/1989 | Kobayashi | 425/133.1 |
| 4,913,924 A * | 4/1990 | Moore | 426/578 |
| 5,004,619 A * | 4/1991 | Kobayashi | 426/297 |
| 5,223,277 A * | 6/1993 | Watanabe et al. | 425/132 |
| 5,378,483 A | 1/1995 | Fazio | |
| 5,401,454 A | 3/1995 | Mendel | |
| 5,464,577 A | 11/1995 | Leonard | |
| 5,500,173 A | 3/1996 | Dugan | |
| 5,518,391 A * | 5/1996 | Tashiro | 425/308 |
| 5,882,711 A * | 3/1999 | Onoguchi et al. | 426/516 |
| 6,143,339 A | 11/2000 | Weinstein | |
| 6,143,342 A | 11/2000 | Weinstein | |
| 6,183,171 B1 * | 2/2001 | Ou-Young | 407/67 |
| 6,248,385 B1 * | 6/2001 | Tashiro | 426/503 |
| 6,302,013 B1 * | 10/2001 | Batagllia | 99/450.2 |
| 6,303,165 B1 * | 10/2001 | Karner | 426/231 |
| 6,892,630 B1 * | 5/2005 | Huang | 99/450.1 |
| 7,306,449 B2 * | 12/2007 | Huang | 425/308 |
| 2002/0017204 A1 * | 2/2002 | Tashiro et al. | 99/485 |
| 2002/0086077 A1 | 7/2002 | Noller | |
| 2004/0070103 A1 | 4/2004 | Bortone | |
| 2004/0185142 A1 * | 9/2004 | Olaru | 425/564 |
| 2005/0019467 A1 * | 1/2005 | Bortone et al. | 426/516 |
| 2005/0048180 A1 | 3/2005 | Moore | |
| 2008/0054513 A1 | 3/2008 | Bortone | |

OTHER PUBLICATIONS

Richardson, Paul N., Choker bar figure from "Introduction to Extrusion," Society of Plastics Engineers, 1974, 2 pages.

European Search Report and Written Opinion, Application No. 11818741.8, mailed Jan. 22, 2015, 7 pages.

* cited by examiner

SYNCHRONIZED CUTTING AND INJECTION SYSTEM AND METHOD

BACKGROUND OF THE INVENTION

1. Technical Field

The present invention relates to a system and method for making a co-filled product.

2. Description of Related Art

Extrusion of products of various profile shapes is usually accomplished by extruding through, for example, wide orifices to produce a sheet of extrudate or as another example, through an annular orifice to produce a tubular extrudate. As used herein a channel is a pipe-like feature or conduit through which product can flow, which is located within an extruder die, and which is in fluid communication with an associated orifice. Extrusion dies having multiple extrusion orifices and radial placement are widely used to make direct expanded products to achieve industrial production rates. After product is extruded it is often cut with a rotating cutting blade. Often the rotating cutting blade rotates at great speeds.

It is desirable to produce an extruded product which has a filling. The filling can add a new flavor, texture, etc. to an extruded product. Manufacturing an extruded product which comprises a filling has proven difficult as the cutting blade often pierces the filling causing it to explode or leak from the extruded product. Consequently, it is desirable to have a system and method for producing a co-filled extruded product that does not result in the exploding or leaking of the filling.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

DETAILED DESCRIPTION

Several embodiments of Applicant's invention will now be described with reference to the drawings. Unless otherwise noted, like elements will be identified by identical numbers throughout all figures. The invention illustratively disclosed herein suitably may be practiced in the absence of any element which is not specifically disclosed herein.

Co-extrusion, as used herein, is the process of making a co-filled product. A co-filled product is a product wherein the center of the product comprises a first food product and the outer layer of the product comprises a second food product, and at least one of the products is extruded. As used herein "center" does not refer to the perfect center for a product but instead refers to an inner layer surrounded by an outer layer. In one embodiment a co-filled product will comprise two or more center layers and a single outer layer.

In one embodiment utilizing co-extrusion, the two products come from two independent sources. For example, in one embodiment the outer layer is a direct-expanded extrudate. A direct-expanded product is one which puffs immediately or shortly after extrusion due to the conditions of the extruder and the properties of the product. A puff refers to the product as it exits the die. In one embodiment the puff has been immediately puffed whereas in other embodiments the puff has not been immediately puffed. In one embodiment, the outer layer comprises an extruded food product. In one embodiment, the extrudate is formed around a die resulting in a hollow product which can be filled with another food product. The center layer may be either extruded from a second extruder or simply pumped. It should be noted that it is also possible to produce a co-filled product wherein the inner product is extrusion cooked and the outer product is not. Thus, in one embodiment a co-filled product either the center layer, the outer layer, or both can be extrusion-cooked food product. As used herein, extrusion cooked refers to product which has been extruded at temperatures sufficient to produce substantial water vapor pressure resulting in product expansion.

Figure 1:
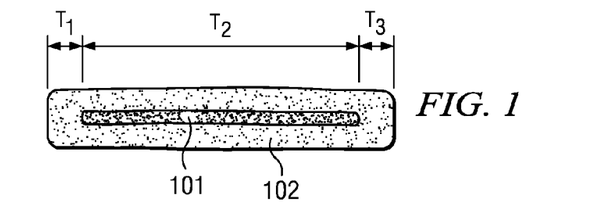
FIG. 1 is a cross sectional view of a puff 100 in one embodiment.

FIG. 1 illustrates a cross sectional view of a puff 100 in one embodiment. The puff 100 comprises a center layer 101 and an outer layer 102. The outer layer 102 can comprise a variety of materials. In one embodiment the outer layer 102 comprises an extrudable material. In one embodiment the outer layer 102 comprises cereal grains, legumes, protein powders, animal or vegetable origin, fruit and vegetable powders, and combinations thereof. In one embodiment the outer layer 102 comprises starch.

As discussed above, the center layer 101 can be extruded or it can simply be pumped. The center layer 101 can comprise virtually any filling including, but not limited to, jelly, sauce, cream, candy, seasonings, cream cheese, cheese slurry, chocolate, peanut butter, flavored oils, flavored water, slurries comprised of oil, spices, protein powders, cheese powders, and combinations thereof. In one embodiment the center layer comprises a viscosity ranging from 1-250,000 Centipoises at room temperature. In one embodiment the center layer 101 comprises a fluid. In one embodiment the center layer 101 is completely surrounded by the outer layer 102. In one embodiment the center layer 101 is surrounded so that it cannot leak from the intact puff 100.

At the right side of the puff is the first no-fill portion T3. This portion is defined by the right end of the puff T3B and the right end T3A of the center layer 101. In this portion there is only a single layer of material. Put differently, there is no center layer 101. In one embodiment the first no-fill portion T3 ranges from 0.25 to about 6 inches in length. In other embodiments the first no-fill portion T3 ranges from about 0.25 to about 1 inch in length. As can be seen, if the puff is cut at the right end of the puff T3B then the blade will only pass through the outer layer 102; the blade will not cut through the center layer 101.

The middle portion T2 of the puff is the portion of the puff comprising at least two layers. As depicted the middle portion T2 comprises a center layer 101 and an outer layer 102. In other embodiments the middle portion T2 comprises more than one center layer 101. In one embodiment the middle portion T2 comprises a first center layer, a second center layer, and an outer layer. In one embodiment the middle portion T2 ranges from about 0.25 to about 3 inches in length.

The left portion of the puff is the second no-fill portion T1. This is similar to the first no-fill position T3. This portion is defined by the left end of the puff T1B and the left end T1A of the center layer 101. In this portion there is only a single layer of material. In one embodiment the second no-fill portion T3 ranges from 0.25 to about 2 inches. In one embodiment the second no-fill portion T3 is approximately equal to the first no-fill portion T1 in length.

In one embodiment the puff is manufactured by first allowing only the outer layer 102 to flow. This represents the first no-fill portion T3 of the puff. Thereafter, the center layer 101 is allowed to flow during the middle portion T2. Then, the flow of the center layer 101 is stopped and only the outer layer 102 is allowed to flow resulting in the second no-fill portion T1 of the puff. As will be discussed, the cutting of the puff is synchronized with the flow of the center layer 101 to ensure that there is not a center layer 101 present at the location of the cuts. Thus, when the puff 100 is cut, the cutting device need only pass through a single layer. Put differently, when the puff 100 is cut the center layer 101 is not altered. As such, the cut does not result in an open end from which the center layer 101 can leak.

Figure 2:
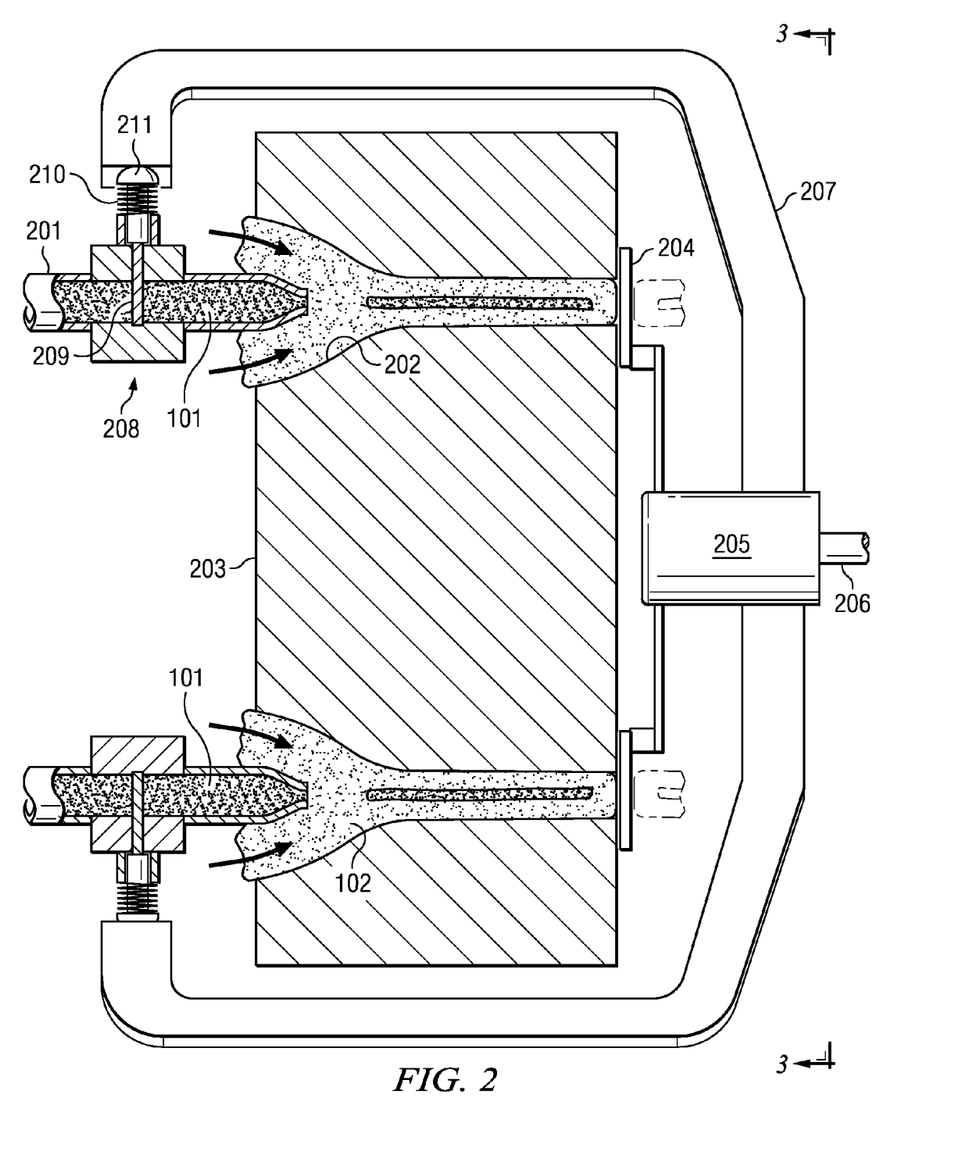

FIG. 2 is a side cross-sectional view of a system in one embodiment. As depicted the system comprises a cutting blade mount 205 which is coupled to at least one cutting blade 204. In one embodiment there is a single cutting blade 204 whereas in other embodiments there are more than one cutting blades 204. In one embodiment there are four cutting blades 204 spaced evenly across the circumference of the cutting blade mount 205. In other embodiments there are one, two, three, four or more cutting blades 204. The cutting blades 204 can comprise straight or curved cutting blades. In one embodiment the cutting blade mount 205 is rotated by a shaft 206. The shaft 206 can rotate at virtually any speed but in one embodiment the shaft 206 rotates at about 250 to about 8,000 RPM.

As depicted the cutting blades 204 are positioned at the exit end of the die face 203. Accordingly when a product exits the die face 203 it is cut by the cutting blade 204. As those skilled in the art will understand, the spacing between the cutting blade 204 and the die face 203 is dependent on a plurality of factors including the velocity of the exiting product, the desired length of the final product, the speed of the rotating cutting blade 204, the distance between cutting blades 204, and others. In one embodiment the cutting blades 204 are located from about 0.25 mm to about 2 mm downstream of the die face 203. In another embodiment the cutting blades 204 are flush against the die face 203. As used herein "downstream" and "upstream" refer to relative locations of an item or event in a process. As a process moves from left to right the leftmost action or item is upstream whereas items moving to the right are referred to as being downstream. Thus, as depicted the cutting blade 204 is downstream of the die face 203.

The die face 203 can comprise any die face known in the art. The die face 203 can comprise a single channel or it may comprise a plurality of channels. In one embodiment the die face 203 comprises a plurality of channels with their exit ends positioned radially along the periphery of the die face 203. As used herein a channel is a pipe-like feature or conduit through which product can flow, which is located within an extruder die, and which is in fluid communication with an associated orifice. Orifices are located on the surface of the die face 203 and the product exits the die face 203 through the orifice. Wide orifices produce a sheet of extrudate whereas an annular orifice produces a tubular extrudate.

As depicted the die face 203 comprises a center feed channel 201 through which the center layer 101 can flow and an outer feed channel 202 through which the outer layer 102 can flow. The center layer 101 is introduced via the center feed channel 201. As depicted the center feed channel 201 terminates within the die face. As such the center layer 101 is introduced to the outer layer 102 before the layers exit the die face 203. In another embodiment center feed channel 201 extends to the surface of the die face 203 and is in communication with an orifice. In such an embodiment the center layer 101 is mixed with the outer layer 102 only after exiting the die face. Thus, the center layer 101 exits its orifice while the outer layer 102 is exiting its orifice. In one embodiment the die face 203 comprises two concentric orifices, a center orifice in communication with the center feed channel 201 and an outer orifice in communication with the outer feed channel 202. Those skilled in the art will understand how long the center channel 202 should extend for a given embodiment.

The outer layer channel 202 is in communication with an outer layer feed source (not shown). In one embodiment the outer layer feed source comprises an extruder. In one embodiment the outer layer feed source comprises a twin feed extruder.

In one embodiment the center layer channel 201 is in communication with a center layer feed source (not shown). The feed source can comprise a feed line, a hopper or other storage device, or other feed sources known in the art. Coupled to the center layer channel 201 is a fluid control device 208. The fluid control device 208 controls the flow of the center layer 101. The fluid control device 208 can comprise any type of device that controls the flow of a fluid including, but not limited to a valve or a pump. In one embodiment the fluid control device 208 comprises a gate valve. In one embodiment the fluid control device 208 comprises at least two positions which regulate flow. In one embodiment the fluid control device 208 comprises an open position which allows the feed to flow and a closed position which prevents the flow of feed. In one embodiment the fluid control device 208 comprises an on position and an off position. In one embodiment wherein the fluid control device 208 comprises a pump, the open position is when the pump is on and fluid is being pumped whereas the off position is when the pump is off and fluid is not being pumped.

As depicted the fluid control device 208 comprises a valve with a fail-open position. Accordingly, absent any force the fluid control device 208 will be maintained in the open position. In other embodiments the fluid control device 208 comprises a fail-close position.

As depicted, to obtain the fail-open position the fluid control device 208 comprises a spring 210 which pushes the pin head 211 and the gate 209 upward. If the pin head 211 is depressed, overcoming the upward force of the spring 210, the gate 209 lowers and the valve is shut. While a spring and gate valve has been depicted the invention is not so limited. Other upward or downward forces including pneumatic or hydraulic forces may also be utilized.

Coupled to the blade mount 205 is a pin pushing device 207. The pin pushing device 207 can comprise a variety of shapes. As depicted the pin pushing device 207 is shaped to rotate around the die face 203 so that it can couple with the fluid control device 208. Because the pin pushing device 207 is coupled to the blade mount 205, as the shaft 206 rotates the mount 205, the pin pushing device 207 also rotates. As depicted, the pin pushing device 207 rotates around the die face 203 so that the pin pushing device 207 intermittently engages the fluid control device 208. As the pin pushing device 207 engages the fluid control device 208, the flow of the center layer 101 is momentarily suspended. Thus, the engagement of the pin pushing device 207 with the fluid control device 208 determines the position of the fluid control device 208.

As depicted the pin pushing device 207 is mechanically coupled to the cutting blade 204. Consequently, as the cutting blade 204 rotates the pin pushing device 207 also rotates. As depicted the pin pushing device 207, which is coupled to the location of the cutting blade 204, is intermittently mechanically coupled with the fluid control device 208. The pin pushing device 207, by intermittently coupling with the fluid control device 208, determines the position of the fluid control device and controls the flow of the center fluid. As such, the operation of the fluid control device is synchronized due to the mechanical coupling of the pin pushing device 207 and the fluid control device. Thus, in one embodiment the location of the cutting blade 204 determines the position of the fluid control device. As will be discussed, in other embodiments the cutting blade 204 is not mechanically coupled to the fluid control device.

It should be noted that while the location of the cutting blade 204 determines the position of the fluid control device the specific position of the fluid control device can be different with different embodiments. As an example, in one embodiment wherein the cutting blade cuts the puff at a location where the center layer is not cut, the fluid control device 208 is in the open position. In another embodiment wherein the cutting blade 204 cuts the puff at a location where the center layer 101 is not cut, the fluid control device 208 is in the closed position. Those skilled in the art will understand that the specific position of the fluid control device 208 relative to the cutting blade 204 is dependent on a variety of factors including distance between the fluid control device 208 and the cutting blade 204, residence time in the die, etc. Taking into account the various factors, in one embodiment the location of the cutting blade 204 determines the necessary position of the fluid control device 208 to ensure that the cutting blade 204 cuts the puff at a location wherein the center layer 101 is not cut.

Figure 2A:
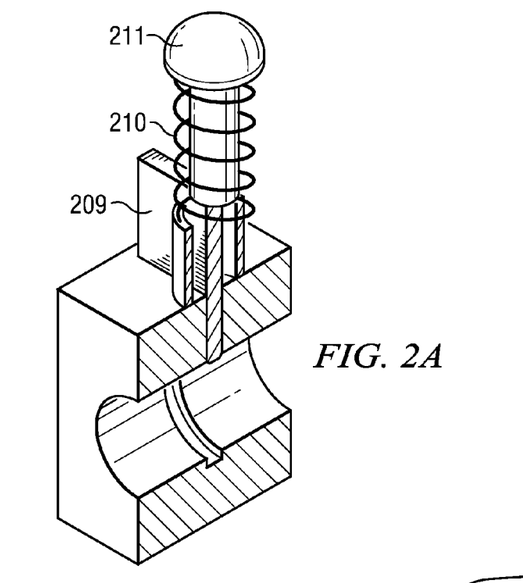
FIG. 2A is a perspective cross-sectional view of the fluid control device in one embodiment wherein the valve is open.
Figure 2B:
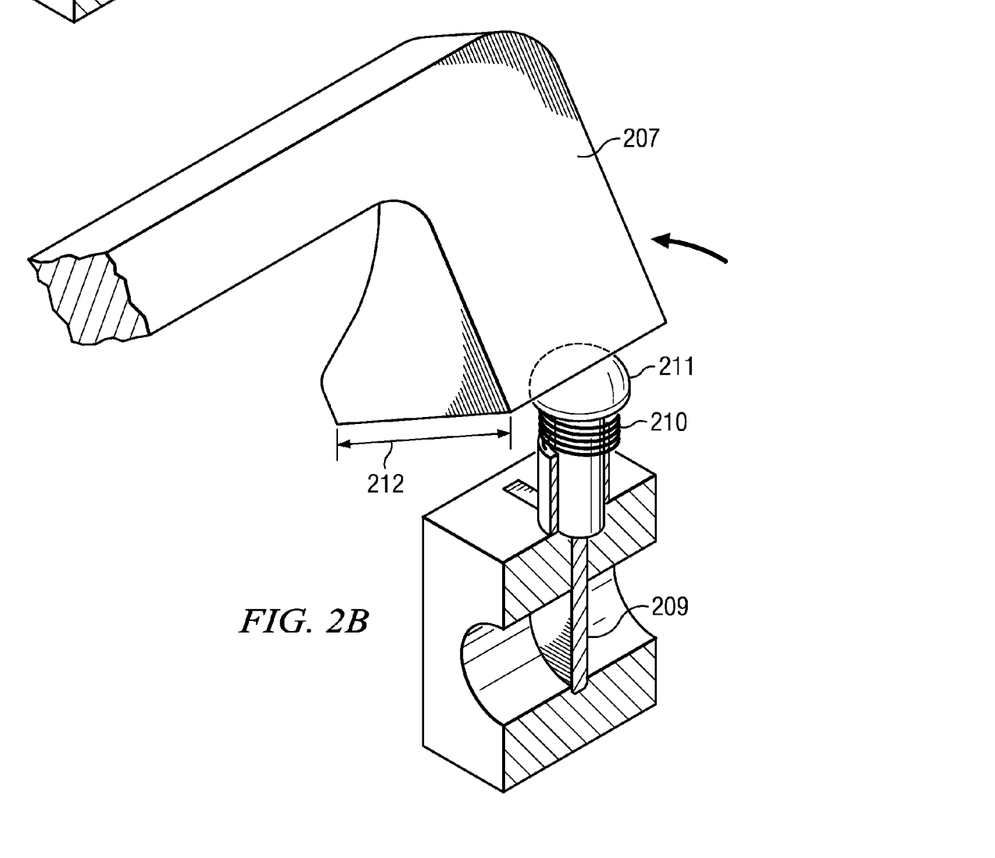
FIG. 2B is a perspective cross-sectional view of the fluid control device in one embodiment wherein the valve is closed.

FIG. 2A is a perspective cross-sectional view of the fluid control device in one embodiment wherein the valve is open. As depicted the fluid control device 208 is a valve comprising a pin head 211, a gate 209, and a spring 210. As discussed, the spring 210 presses upon the pin head 211 to maintain the fluid control device 208 in an open position. As can be seen, the center feed 101 can flow through the fluid control device 208 because the gate 209 is not restricting its flow. FIG. 2B is a perspective cross-sectional view of the fluid control device in one embodiment wherein the valve is closed. As depicted the pin pushing device 207 has been rotated to engage the fluid control device 208. The pin pushing device 207 engages the pin head 211 and presses the gate 209 downward. This results in the fluid control device 208 being closed which momentarily stops the flow of the center feed 101. In one embodiment the pin head 211 comprises a rounded head to allow for a smoother engagement of the pin pushing device 207 with the pin head 211. In one embodiment the surface of the pin pushing device 207 contacting the pin head 211 is angled or beveled to allow for a smoother engagement with the pin head 211.

As depicted the pin pushing device 207 has a thickness 212. In one embodiment the thickness 212 of the pin pushing device 207 is proportional to the amount of time that the fluid control device 208 is in the closed position. As depicted the pin pushing device 207 moves from right to left as it rotates. Accordingly, if the thickness 212 of the pin pushing device 207 is increased then the amount of time the fluid control position is in the closed position also increases. In one embodiment the thickness 212 of the pin pushing device 207 is proportional to the distances of the first T1 and second T2 no-fill portions of the puff. In one embodiment each pin pushing device 207 comprises a similar thickness. In one embodiment wherein each pin pushing device 207 comprise a similar thickness, then the length of the first T1 and second T2 no-fill portions of the puff are similar. In other embodiments at least one pin pushing device 207 comprises a dissimilar thickness. In one embodiment alternating pin pushing devices 207 comprise similar thicknesses. In such an embodiment a first pin pushing device 207 will comprise a first thickness, a second pin pushing device 207 will comprise a second thickness, a third pin pushing device 207 will comprise a first thickness, and a fourth pin pushing device 207 will comprise a second thickness. Such an embodiment allows the first no-fill portion T3 to be dissimilar in length from the second no-fill portion T1.

Figure 3:
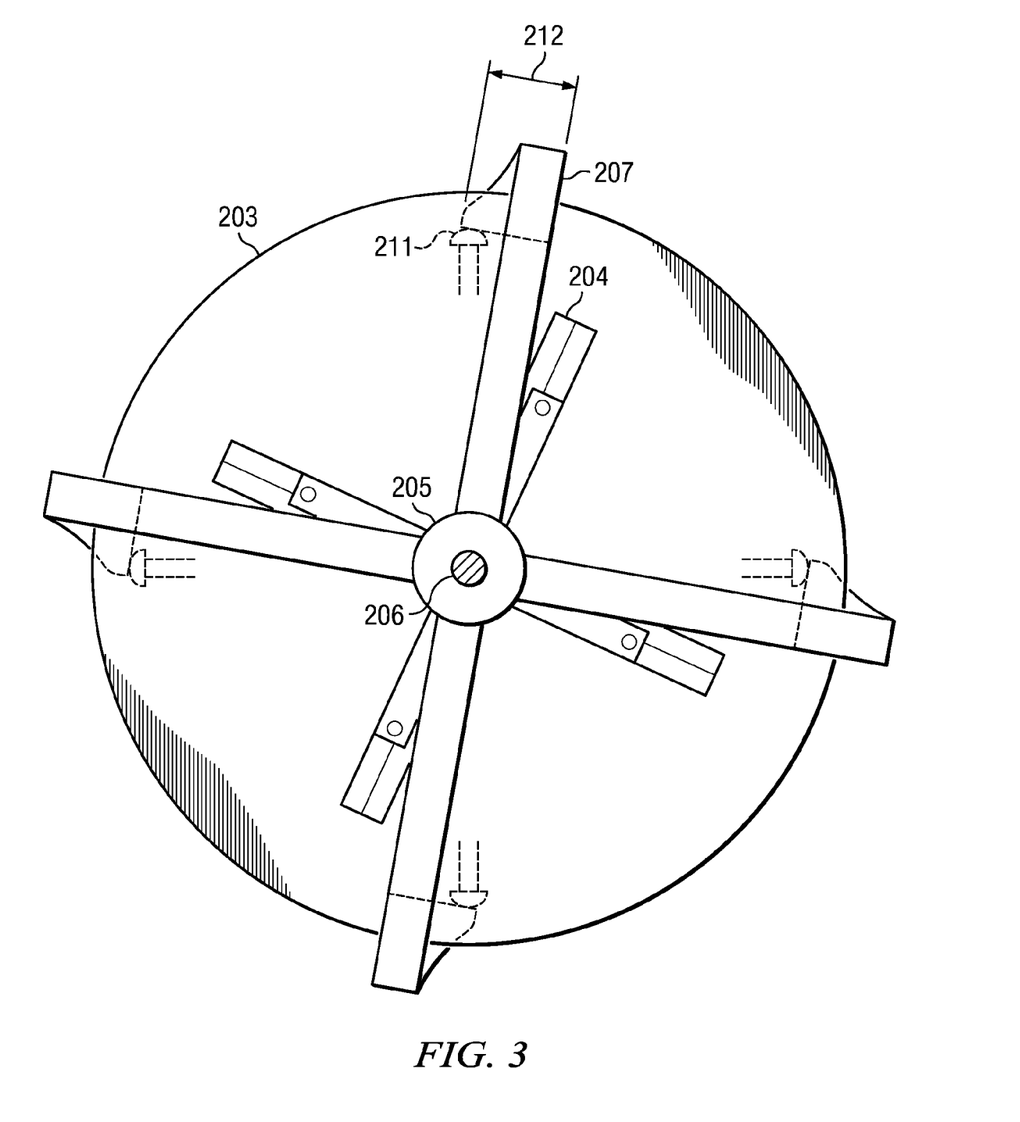
FIG. 3 is a front planar view of the die face in one embodiment.

FIG. 3 is a front planar view of the die face in one embodiment. As depicted the cutting blade 204 and the pin pushing device 207 are coupled to the blade mount 205. As depicted the blade mount 205 rotates in the clockwise position. In one embodiment, as depicted, the pin pushing device 207 is slightly offset from the cutting blade 204. In one embodiment the offset is from about 0.5 degrees to about 45 degrees. In another embodiment the offset is from about 1 to about 30 degrees. As the blade mount 205 is rotated the pin pushing device 207 will engage the fluid control device 208 before the cutting blade 204 will cut the puff. Thus, by the time the cutting blade 204 cuts the puff the flow for the center layer 101 has already been momentarily stopped. Accordingly, the portion of the puff being cut by the cutting blade 204 will not comprise a center layer 101. As such, when the puff is cut by the cutting blade 204, the cutting blade 204 will only cut through a single layer; the cutting blade 204 will not cut through the center feed 101.

In one embodiment the pin pushing device 207 will overlap with the cutting blade 204. In other embodiments the pin pushing device 207 will not overlap with the cutting blade 204. Those skilled in the art will understand that whether or not the pin pushing device 207 overlaps with the cutting blade 204 is a factor of a plurality of factors including the thickness 212 of the pin pushing device, the rotational speed, the desired product, etc.

Figure 4:
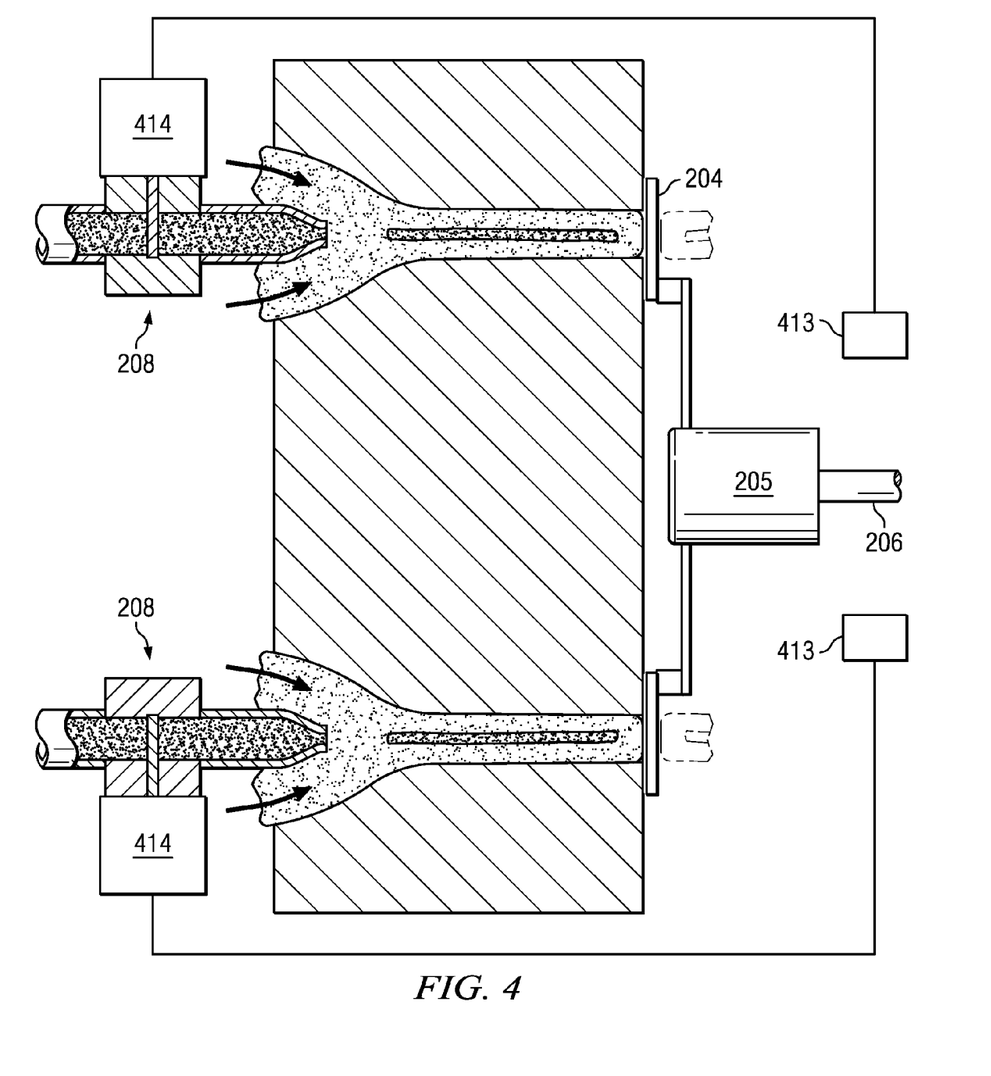
FIG. 4 is a side cross-sectional view of a system in one embodiment comprising a sensor.

While one embodiment has been described wherein the valve is mechanically coupled with a pin pushing device, other embodiments do not require mechanical coupling. FIG. 4 is a side cross-sectional view of a system in one embodiment comprising a sensor. As depicted the system comprises sensors 413. In one embodiment multiple sensors 413 are used whereas in other embodiment a single sensor 413 is utilized. The sensor 413 can comprise any sensor known in the art. In one embodiment the sensor determines the location of the cutting blade 204. The sensor 413 is in communication with the fluid control device 208 and relays this information to the fluid control device 208 so the fluid control device 208 can operate as previously described. As described, in one embodiment the fluid control device 208 operates so that the portions of the puff that are being cut by the cutting blade 204 do not comprise a center layer 101. In one embodiment the sensor 413 monitors the shaft 206. In such an embodiment because the cutting blade 204 is in a fixed position relative to the shaft 206 position by monitoring the shaft 206 the location of the cutting blade 204 is also known. In one embodiment the sensor 413 senses a fixed point on the rotating shaft 206. In another embodiment the sensor 413 senses the cutting blade 204. In another embodiment the sensor 413 senses the blade mount 205. Those skilled in the art will understand the various devices and methods used to sense the location of the cutting blade 204.

Once the location of the cutting blade has been determined, that information is shared with the fluid control device 208 via a receiver 414. A receiver 414 can comprise any device known in the art for receiving a signal from a sensor 413. In one embodiment the receiver 414 receives a wireless signal from the sensor 413 whereas in other embodiments the receiver 414 is coupled to the sensor 413 via a wire.

As previously discussed the fluid control device 208 can comprise virtually any device known for controlling flow of a fluid. One embodiment wherein the fluid control device 208 comprises a valve has been discussed. In such an embodiment the valve is manipulated to regulate flow. The valve can comprise virtually any type of valve. In one embodiment the valve is controlled via a servo motor. In one embodiment the servo motor oscillates to allow and prevent flow through the valve. In one embodiment the valve is controlled electromechanically whereby the valve is synchronized with the cutting blade. In other embodiments the valve is controlled electromagnetically whereby magnets are used to synchronize the valve operation with the cutting blades. In one embodiment the valve operates in a pulsating fashion to allow and prevent flow in such a way that it is synchronized with the location of the cutting blade. While a fluid control device 208 comprising a valve has been discussed, the invention is not so limited. As discussed in one embodiment the fluid control device 208 comprises a pump. In such an embodiment the pump can be engaged to provide flow of the center layer and then disengaged to stop flow. In one embodiment the pump is turned on and off to engage and disengage. In another embodiment the pump is not stopped but the pressure is intermittently regulated to provide and interrupt flow. In another embodiment the pump operation is controlled to yield the desired flow. The fluid control device 208 can be controlled by methods known in the art. In one embodiment the fluid control device 408 is pneumatically controlled whereas in other embodiments it is hydraulically controlled.

While a system has been described, a method for cutting a co-filled product will be described. First an outer layer 102 is directed into a die. Likewise, a center layer 101 is directed into a die. As previously discussed, both or either of these layers can be extruded. The center 101 and outer layers 102 are joined. As previously described the center 101 and outer layers 102 can be joined within the die or can be joined upon exiting the die 203. Upon exiting the die 203, a puff is formed. As discussed in more detail below, the center layer 101 can comprise dissimilar materials. Thus, a first center layer may be directed into a die and then a second center layer may be directed into a die.

Using methods and systems previously described, the flow of the center layer 101 is stopped using a fluid control device 208. As previously described the fluid control device 208 comprises at least two positions. In one embodiment the fluid control device 208 comprises an on position and an off position whereas in other embodiments the fluid control device 208 comprises an open position and a closed position.

In one embodiment the stopping of the center layer 101 comprises synchronizing the fluid control device 208 with the location of at least one cutting blade 204. This synchronization can be accomplished in any method described herein, including coupling the fluid control device 208 with a pin pushing device 207 or utilizing a sensor 213 which is in communication with the fluid control device 208.

In one embodiment after the flow of the center layer 101 has been stopped, the puff is cut. In one embodiment the puff is cut with a rotating cutting blade 204 located downstream of the die face 203. In one embodiment the cutting blade 204 cuts the puff at a location where it does not cut through the center layer 101.

In one embodiment after the flow of the center layer 101 has been stopped, the flow of the center layer 101 is opened. It should be noted that in some embodiments the flow is opened after the cut has occurred. In other embodiments the puff is being cut while the flow of the center layer 101 is open. After the center layer 101 flow is opened then it is stopped via the fluid control device 208. The whole process is repeated to produce co-filled product.

Figure 5:
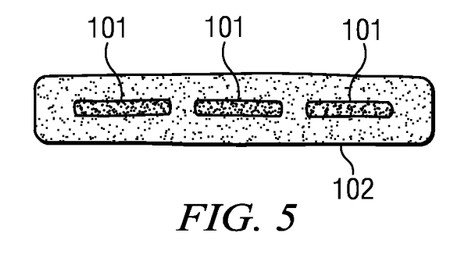
FIG. 5 is a cross sectional view of a puff comprising a plurality of center layers in one embodiment.

In another embodiment a co-filled product comprising more than one center layer 101 is formed. FIG. 5 is a cross sectional view of a puff comprising a plurality of center layers 101 in one embodiment. As shown in FIG. 5, three distinct center layers 101 are formed in series. Virtually any number of center layers 101 can be formed. In one embodiment two or more center layers 101 in series are formed.

There are a variety of ways to manufacture a puff with a plurality of center portions 101 in series. In one embodiment the cutting blade 204 operates at a dissimilar speed from the pin pushing device 207. For example, referring to FIG. 2, in one embodiment the cutting blade 204 is coupled to a gear mechanism which speeds or slows the rotation of the cutting blade 204 as desired. In one embodiment to produce a puff comprising a plurality of center portions 101 in series, the cutting blade 204 is geared down to turn at a slower speed than the pin pushing device 207. In such an embodiment the pin pushing device 207 stops the flow of the center layer 101 to create the distinct center layers 101. After the pin pushing device 207 has created the desired number of center layers 101, the cutting blade 204 cuts the puff. Those skilled in the art will understand different ways to change the speed of the cutting blade 204 relative to the pin pushing device 207. As described this can be accomplished with a gear, sprocket, pulley, etc., or this can be accomplished with a control system. For example, in one embodiment the cutting blade 204 is coupled to a dissimilar motor than the pin pushing device 207. The motor speeds of the pin pushing device 207 and the cutting blade 204 can be controlled by a control system as described in reference to FIG. 4.

Figure 6:
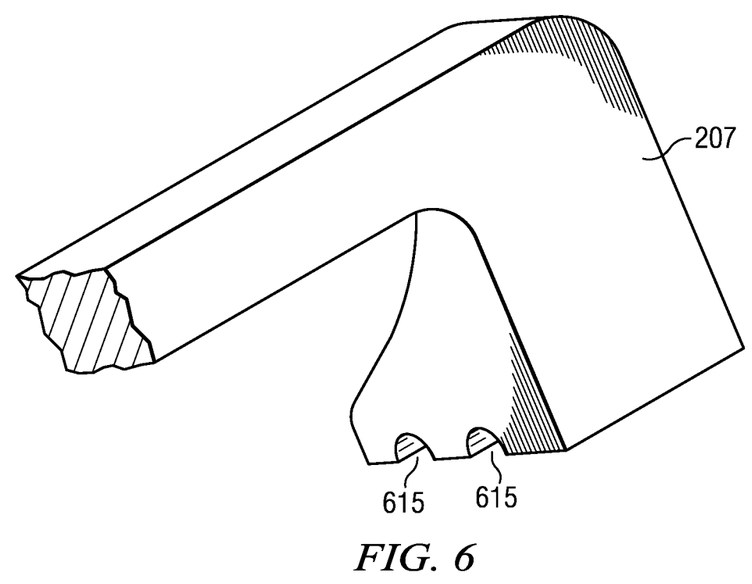
FIG. 6 is a perspective view of the pin pushing device comprising control knobs in one embodiment.

In another embodiment the pin pushing device 207 comprises control knobs. FIG. 6 is a perspective view of the pin pushing device 207 comprising control knobs 615 in one embodiment. A control knob 615 is a region on the pin pushing device 207 which manipulates the fluid control device. The control knobs can be internal void spaces such as divots, or they can comprise external pieces which extend beyond the plane of the pin pushing device 207. In one embodiment, as depicted, the control knob 615 comprises divots. As depicted, the pin pushing device 207 comprises two control knobs 615 comprising divots. As can be seen, if the pin pushing device 207 of FIG. 6 was used in the fluid control device of FIG. 2B, the control knob divots allow the valve to momentarily open by providing a place for the pin head 211 to expand. When the valve is momentarily open, a center layer 101 is formed. As noted above, however, in other embodiments such as fail-close valves, the valves are not opened until they are contacted by the pin pushing device 207. In another embodiment, the control knobs 615 comprise external knobs that manipulate the fluid control device.

In one embodiment the pin pushing device 207 surrounds the entire die 203. In such an embodiment the locations of the control knobs 615 are synchronized with the location of the cutting blade 204. For example, if the pin pushing device of FIG. 6 completely surrounded the entire die 203, the fluid control device would be closed when located below the planar portion of the pin pushing device 207. However, when the fluid control device is located below the control knob 615 portion of the pin pushing device 207, the fluid control device is in the open position. The cutting blade 204 can be synchronized to cut based on the location of the control knobs 615.

In one embodiment each center layer 101 comprises the same material. In another embodiment at least one center layer 101 comprises a material which is dissimilar from the remaining center layers 101. For example, the left center layer 101 may comprise a cheddar cheese filling whereas the right center layer 101 may comprise a garlic cheese powder. In such a way the consumer can encounter different tastes with each center layer 101. This can be accomplished in many ways as discussed above. In one embodiment separate feed sources will be fed into the die. In one embodiment the fluid control device 208 is manipulated to allow separate feed sources to be fed into the die, resulting in dissimilar center layers 101. As an example, two fluid control devices 208 can be located adjacent to one another so they are controlled by the same pin pushing device 207. In such an embodiment as the pin pushing device 207 rotates it first encounters a first fluid control device 208 associated with a first center layer. As the pin pushing device 207 continues to rotate it encounters a second fluid control device 208 associated with a second center layer. In one embodiment the first and second fluid control devices are coupled to the same channel so that a single puff comprises material from each fluid control device. In one embodiment the first and second fluid control devices are coupled to dissimilar center layer sources. As discussed above, a first fluid control device can be coupled to a cheddar cheese filling source whereas a second fluid control device can be coupled to a garlic cheese powder source. Those skilled in the art will understand the different ways of controlling the flow of different feed sources being fed into a die.

While the invention has been particularly shown and described with reference to a preferred embodiment, it will be understood by those skilled in the art that various changes in form and detail may be made therein without departing from the spirit and scope of the invention.

ADDITIONAL DESCRIPTION

The following clauses are offered as further description of the disclosed invention.

1. A system for producing a co-filled product comprising:
    a die face comprising a center channel through which a center layer can flow and an outer feed channel through which an outer layer can flow;
    at least one cutting blade located downstream from said die face;
    at least one fluid control device coupled to said center channel, wherein said fluid control device comprises at least two positions;
    wherein the location of said at least one cutting blade determines the position of said at least one fluid control device.
2. The system according to any preceding clause further comprising a sensor in communication with said at least one fluid control device.
3. The system according to any preceding clause wherein said sensor determines the location of said at least one cutting blade.
4. The system according to any preceding clause wherein said fluid control device comprises a valve.
5. The system according to any preceding clause wherein said fluid control device comprises a gate valve.
6. The system according to any preceding clause further comprising at least one pin pushing device coupled to said at least one cutting blade.
7. The system according to clause 6 wherein said at least one pin pushing device is offset from said at least one cutting blade.
8. The system according to clause 6 wherein said at least pin pushing device intermittently engages said at least one fluid control device.
9. The system according to clause 8 wherein during said at least one pin pushing device intermittently engages said at least one fluid control device to stop the flow of said center feed.
10. The system according to clause 6 wherein said at least two positions comprises an open position and a closed position.
11. The system according to clause 10 wherein the width of said pin pushing device is proportional to the time said valve is in said closed position.
12. The system according to clause 6 wherein said at least one pin pushing device comprises at least one control knob.
13. The system according to any preceding clause wherein said at least two positions comprises an open position and a closed position.
14. The system according to any preceding clause wherein said at least two positions comprises an on position and an off position.
15. The system according to any preceding clause wherein at least two fluid control devices are coupled to said center channel.
16. The system according to any preceding clause comprising at least two center channels.
17. A method for cutting a co-filled product comprising:
    a. directing an outer layer into a die;
    b. directing a center layer into a die;
    c. joining said center and said outer feed to form a puff;
    d. stopping the flow of said center feed with a fluid control device;
    e. cutting said puff with a cutting blade.
18. The method according to clause 17 wherein said stopping step comprises synchronizing said fluid control device with the location of said cutting blade.
19. The method according to clause 18 wherein said synchronizing comprises a sensor in communication with said fluid control device.
20. The method according to clause 18 wherein said synchronizing comprises mechanically coupling said fluid control device with a pin pushing device.
21. The method according to clauses 17-20 wherein said cutting blade is mechanically coupled to a pushing pin device, and wherein said pushing pin device intermittently engages said fluid control device.
22. The method according to clauses 17-21 further comprising:
    f. opening the flow of said center layer with said fluid control device;
    g. stopping the flow of said center layer with a fluid control device;
    h. cutting said puff with a cutting blade.
23. The method according to clauses 17-22 wherein said fluid control device comprises at least two positions, and wherein said stopping step comprises adjusting said fluid control device between said at least two positions.
24. The method according to clause 23 wherein said stopping step comprises adjusting said fluid control device between an on position and an off position.

25. The method according to clause 23 wherein said stopping step comprises adjusting said fluid control device between an open position and a closed position.
26. The method according to clauses 17-25 wherein said cutting step does not comprise cutting through said center layer.
27. The method according to clauses 17-26 further comprising:
   f. opening the flow of said center layer with said fluid control device;
   g. stopping the flow of said center layer with a fluid control device; wherein steps f) and g) occur after said step d) and before said step e).
28. The method according to clause 27 wherein step d) comprises stopping the flow of said center feed with a first fluid control device, step f) comprises opening the flow of said center feed with a second fluid control device, and step g) comprises stopping the flow of said center feed with a second fluid control device.
29. The method according to clause 28 wherein said first and said second fluid control devices are coupled to dissimilar center layer sources.

What is claimed is:

1. A system for producing a co-filled product having a center layer and an outer layer, the system comprising:
   a die face comprising a center channel through which the center layer can flow and an outer feed channel through which the outer layer can flow;
   at least one fluid control device coupled to said center channel, wherein said fluid control device comprises at least two operative positions to cause intermittent flow in the center channel;
   at least one cutting blade located downstream from the die face, wherein the at least one cutting blade is coupled to a blade mount rotated by a shaft;
   a sensor in communication with the at least one fluid control device, wherein the sensor determines a location of the at least one cutting blade during cutting by sensing at least one of the blade mount, the at least one cutting blade, and the shaft during rotation, and wherein operation of the at least one fluid control device is synchronized with the location of the at least one cutting blade, which determines the at least two operative positions of the fluid control device to cause the intermittent flow in the center channel,
   enables the at least one cutting blade to cut through an extrudate to form a puff while avoiding cutting into a section of the extrudate that includes intermittent flow from the center channel.
2. The system of claim 1 wherein said fluid control device comprises a valve.
3. The system of claim 1 wherein said fluid control device comprises a gate valve.
4. A system for producing a co-filled product having a center layer and an outer layer, the system comprising:
   a die face comprising a center channel through which the center layer can flow and an outer feed channel through which the outer layer can flow;
   at least one fluid control device coupled to said center channel, wherein said fluid control device comprises at least two operative positions to cause intermittent flow in the center channel;
   at least one cutting blade located downstream from the die face, wherein the at least one cutting blade is coupled to a blade mount rotated by a shaft;
   at least one pin pushing device coupled with the at least one cutting blade so that rotation of the at least cutting blade causes rotation of the at least one pin pushing device, which intermittently engages the at least one fluid control device,
   wherein synchronization of the at least one cutting blade and the operation of the at least one fluid control device enables the at least one cutting blade to cut through an extrudate to form a puff while avoiding cutting into a section of the extrudate that includes intermittent flow from the center channel.
5. The system of claim 4 wherein said at least one pin pushing device is offset from said at least one cutting blade.
6. The system of claim 4 wherein said at least pin pushing device intermittently engages said at least one fluid control device.
7. The system of claim 6 wherein during use, said at least one pin pushing device intermittently engages said at least one fluid control device to stop the flow of said center feed.
8. The system of claim 4 wherein said at least two positions comprises an open position and a closed position.
9. The system of claim 8 wherein the fluid control device is a valve, and wherein a width of said pin pushing device is proportional to the time said valve is in said closed position.
10. The system of claim 4 wherein at least one pin pushing device comprises at least one control knob.
11. The system of claim 1 wherein said at least two positions comprises an open position and a closed position.
12. The system of claim 1 wherein said at least two positions comprises an on position and an off position.
13. The system of claim 1 wherein at least two fluid control devices are coupled to said center channel.
14. The system of claim 1 further comprising at least two center channels.
15. A method for cutting a co-filled product having a center layer and an outer layer, the method comprising:
   directing the outer layer into a die;
   intermittently directing the center layer into the die by a fluid control device having at least two operative positions;
   joining said center layer and said outer layer to form a puff having the center layer enclosed within the outer layer, upon exiting from the die;
   cutting said exiting puff off with a cutting blade without cutting the center layer of the puff, wherein the cutting blade is coupled to a blade mount rotated by a shaft; and
   determining a location of said cutting blade by sensing at least one of the blade mount, the cutting blade, and the shaft during rotation, wherein operation of the at least one fluid control device is synchronized with the location of the cutting blade, which determines the at least two operative positions of the fluid control device to cause intermittent flow of the center layer.
16. A method for cutting a co-filled product having a center layer and an outer layer, the method comprising:
   directing the outer layer into a die;
   intermittently directing the center layer into the die by a fluid control device having at least two operative positions;
   joining said center and said outer feed to form a puff having a center layer enclosed within an inner layer, upon exiting from the die;
   cutting said exiting puff off with a cutting blade without cutting the center layer of the puff, wherein the cutting blade is coupled to a blade mount rotated by a shaft; and
   wherein said intermittently directing further comprises mechanically coupling said fluid control device with a pin pushing device coupled with the cutting blade so that rotation of the cutting blade causes the pin pushing device to intermittently engage the fluid control device.

17. The method of claim 16 wherein said cutting blade is mechanically coupled to the pin pushing device, and wherein said pin pushing device intermittently engages said fluid control device.

18. The method of claim 15 wherein the step of intermittently directing comprises:
opening the flow of said center layer with the fluid control device; and
stopping the flow of said center layer with the fluid control device.

19. The method of claim 15 wherein said step of intermittently directing comprises adjusting said fluid control device between an on position and an off position.

20. The method of claim 15 wherein said step of intermittently directing comprises adjusting said fluid control device between an open position and a closed position synchronously with the step of cutting.

21. The method of claim 15 further comprising:
repeating the directing step, the intermittently directing step, the joining step, and the cutting step.

22. The method of claim 15 wherein step of intermittently directing comprises opening and closing a first fluid control device and opening and closing a second fluid control device.

23. The method of claim 22 wherein said first and said second fluid control devices are coupled to dissimilar center layer sources.

24. The system of claim 4 wherein said fluid control device comprises a pin head coupled to a valve, and wherein said pin pushing device intermittently contacts said pin head.

25. The system of claim 24 wherein said fluid control device further comprises a spring.

26. The method of claim 4 wherein said fluid control device comprises a pin head coupled to a valve, and wherein said pin pushing device intermittently contacts said pin head.

27. The method of claim 26 wherein said fluid control device further comprises a spring.

* * * * *